United States Patent [19]
Kim et al.

[11] Patent Number: 5,799,019
[45] Date of Patent: Aug. 25, 1998

[54] CIRCUIT FOR CONVERTING FRAME DATA

[75] Inventors: Young-Goo Kim, Kyounggi-do; Sung-Dong Kim, Taegu, both of Rep. of Korea

[73] Assignee: Hyundai Electronics Ind. Co., Ltd., Rep. of Korea

[21] Appl. No.: 664,001

[22] Filed: Jun. 14, 1996

[30] Foreign Application Priority Data

Jun. 28, 1995 [KR] Rep. of Korea ............... 17960 1995
Jun. 28, 1995 [KR] Rep. of Korea ............... 17961 1995

[51] Int. Cl.$^6$ ............................. H04J 3/16; H04J 3/22
[52] U.S. Cl. ............................. 370/465; 370/470
[58] Field of Search ............................. 370/464, 465, 370/466, 467, 366, 532, 535, 537, 540, 470, 472, 476

[56] References Cited

U.S. PATENT DOCUMENTS

| | | | |
|---|---|---|---|
| 5,060,227 | 10/1991 | Finley et al. | 370/397 |
| 5,524,111 | 6/1996 | Le Pennec et al. | 370/540 |
| 5,623,491 | 4/1997 | Skoog | 370/397 |
| 5,627,820 | 5/1997 | Kwan | 370/852 |

Primary Examiner—Douglas W. Olms
Assistant Examiner—Ajit Patel
Attorney, Agent, or Firm—Whitham, Curtis, Whitham & McGinn

[57] ABSTRACT

A circuit for converting frame data is disclosed, in which data communications can be carried out by matching the T1 repeater line of the North American method and the E1 repeater line of the CEPT. The four 32-channel frame data of the E1 line of the CEPT method are converted into parallel data of 8-bit one channel, and are stored into four 64-byte buffers. The stored 32-channel frame data are read out by 24 channels at a time, while the remaining data of the 6 channels are added to the data which have been stored in the buffers. Thus five 24-channel frame data are converted into serial data before being outputted. Of the five 24-channel frame data of the T1 repeater line of the North American method, four 24-channel frame data are stored into four 64-byte buffers, while the remaining one 24-channel frame data are separated by 6 so as to store them into the four 64-byte buffers, so that the four 64-byte buffers can store the 32-channel data respectively. The 32-channel data which have been stored in the four 64-byte buffers are sequentially read out, and then, are converted into serial data before outputting them.

10 Claims, 5 Drawing Sheets

CIRCUIT FOR CONVERTING FRAME DATA

BACKGROUND OF THE INVENTION

1. Field of the invention

The present invention relates to a circuit for converting frame data, in which data communications can be carried out by matching the T1 repeater line of the North American method and the E1 repeater line of the CEPT (Conference European des Administrations des Postes et des Telecommunications).

2. Description of the prior art

The E1 repeater line of the CEPT method is widely used in the European countries, and is recommended by the CCITT (Comite Consultatif International telegraphique et Telephonique). Each channel of this E1 repeater line consists of 8 bits like the North American Method.

One frame includes 32 channels consisting of 30 message channels, one frame aligning channel, and one signaling information channel, while the multiplexing step includes four steps.

Meanwhile, the T1 repeater line of the North American method is widely used in the North American region including the United States. Each channel of this T1 repeater line consists of 8 bits, and one frame consists of 24 channels, while the multiplexing step includes 5 steps.

Therefore, if the E1 repeater line of the CEPT method and the T1 repeater line of the North American method are to be connected together so as to carry out data communications, then the frame data of the E1 repeater line of the CEPT method and the frame data of the T1 repeater line of the North American method have to be mutually converted so as to match them.

That is, the four 32-channel frame data of the E1 repeater line of the CEPT method have to be converted into five 24-channel frame data, while the five 24-channel frame data of the T1 repeater line of the North American method have to be converted into four 32-channel frame data.

Thus the four 32-channel frame data of the E1 repeater line of the CEPT method are matched with the five 24-channel frame data of the T1 repeater line of the North American method so as to make it possible to mutually transmit data. Conventionally in order to make this possible, exclusive time switch ICs are disposed between the E1 repeater line and the T1 repeater line so as to convert the frame data.

However, the exclusive time switch IC is very expensive, and the number of the IC to be installed is very large.

Therefore, the production cost is increased, and the size of the printed circuit board becomes large, with the result that making the product compact was impeded.

SUMMARY OF THE INVENTION

The present invention is intended to overcome the above described disadvantages of the conventional technique.

Therefore it is an object of the present invention to provide a circuit for converting the frame data in which, without using an exclusive time switch IC group, the four 32-channel frame data of the E1 repeater line of the CEPT method are converted into five 24-channel frame data of the T1 repeater line of the North American method.

It is another object of the present invention to provide a circuit for converting the frame data in which the five 24-channel frame data of the T1 repeater line of the North American method are converted into four 32-channel frame data of the E1 repeater line of the CEPT method.

In achieving the above objects, the circuit for converting the frame data according to the present invention frequency-divides the incoming clock signals to $\frac{1}{8}$, $\frac{1}{4}$, and $\frac{1}{32}$ in synchronization with the frame data.

In the case where the four 32-channel frame data of the E1 repeater line of the CEPT method are converted into the five 24-channel frame data of the T1 repeater line, the converting operation is carried out in the following manner. That is, in accordance with clock signals, serially inputted four 32-channel frame data are converted into parallel data by four serial/parallel shift registers, each of the registers converting one channel. Thus the four serial/parallel shift registers output parallel data, and these parallel data are stored in four 64-byte buffers in accordance with the output signals of four recording position counters which count $\frac{1}{8}$-frequency-divided clock signals.

The data which have been stored in the four 64-byte buffers are outputted in accordance with the output signals of four reading position counters which count $\frac{1}{8}$-frequency-divided clock signals. The data are further outputted in accordance with the output signals of still another reading position counter which counts $\frac{1}{8}$-frequency-divided clock signals.

The data which are outputted in accordance with the output signals of the mentioned five reading position counters are converted into serial data by five parallel/serial shift registers before being outputted.

Under this condition, these four and one reading position counters cannot simultaneously access the four 64-byte buffers to make the stored data outputted.

Therefore, in the present invention, controls are carried out by means of $\frac{1}{4}$-frequency-divided clock signals, so that the four and one reading position counters can access the four 64-byte buffers. Further, in accordance with $\frac{1}{32}$ frequency-divided signals, another reading position counter accesses the four 64-byte buffers in a sequential manner so as to make the stored data outputted.

Further, in the present invention, when the five 24-channel frame data of the T1 repeater line of the North American method are converted into four 32-channel frame data of the E1 repeater line of the CEPT method, the serially inputted five 24-channel frame data are converted into parallel data by the four serial/parallel shift registers in accordance with clock signals, each of the four serial/parallel shift registers converting one channel.

The output parallel data of the four serial/parallel shift registers are stored in the four 64-byte buffers in accordance with the output signals of four recording position counters which count the $\frac{1}{8}$-frequency-divided clock signals. Further, the mentioned output parallel data are stored in the four 64-byte buffers in accordance with the output signals of another recording position counter which counts the $\frac{1}{8}$frequency-divided clock signals.

Under this condition, the four recording position counters and another recording position counter cannot simultaneously access to the four 64-byte buffers to store the data.

Therefore, in the present invention, the accessing by the four recording position counters and another recording position counter to the four 64-byte buffers is controlled by means of $\frac{1}{4}$-frequency-divided clock signals. Further another recording position counter sequentially accesses the four 64-byte buffers in accordance with $\frac{1}{32}$-frequency-divided clock signals so as to store the data.

The data which are stored in the four 64-byte buffers are outputted in accordance with the output signals of four reading position counters which count ⅛-frequency-divided clock signals. These output data are converted into serial data by four parallel/serial shift registers.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 1:
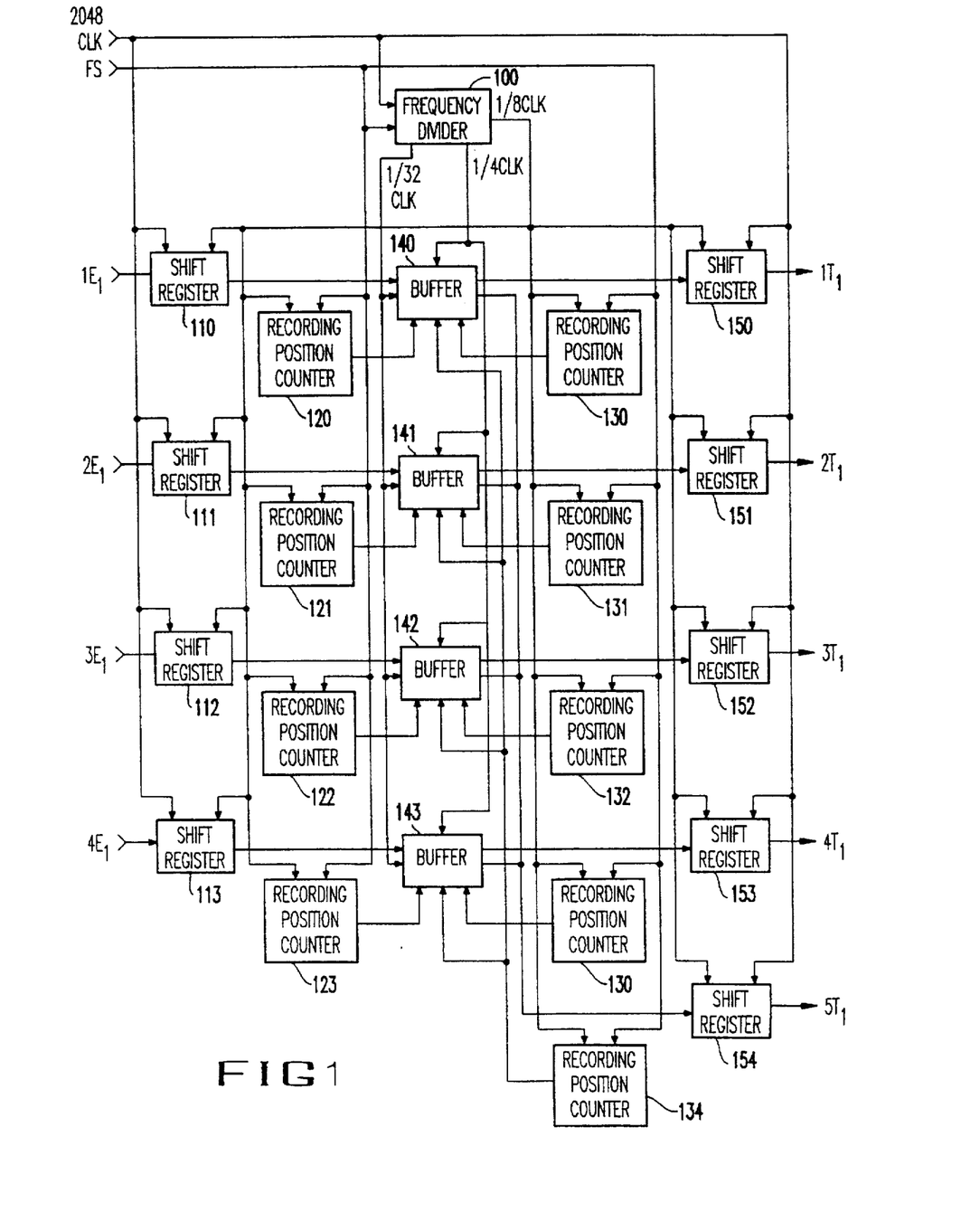
FIG. 1 illustrates an embodiment of the frame data converting circuit for converting the 32-channel frame data of the E1 repeater line of the CEPT method to the 24-channel frame data of the T1 repeater line of the North American method according to the present invention.

FIG. 1 illustrates an embodiment of the frame data converting circuit for converting the 32-channel frame data of the E1 repeater line of the CEPT method to the 24-channel frame data of the T1 repeater line of the North American method according to the present invention.

Reference code 100 indicates a frequency divider for frequency-dividing clock signals (2048CLK) which are inputted with a frequency of 2048 KHz in synchronization with 32-channel frame data 1E1–4E1 of the E1 repeater line of the CEPT method.

The frequency divider 100 is cleared in accordance with frame synchronizing signals FS, and starting from the cleared time, frequency-divides the clock signals 2048CLK to ¼, ⅛ and 1/32 so as to synchronously output ¼-frequency-divided clock signals ¼CLK, ⅛-frequency-divided clock signals ⅛CLK, and 1/32-frequency-divided clock signals 1/32CLK.

Reference codes 110–113 indicate serial/parallel shift registers for converting the serially inputted four 32-channel frame data 1E1–4E1 of the E1 repeater line to parallel data by one channel each time.

The serial/parallel shift registers 110–113 shift the received 32-channel frame data 1E1–4E1 in accordance with the clock signals 2048CLK, and outputs them in 8-bit one channel parallel data in accordance with the ⅛-frequency-divided clock signals ⅛CLK of the frequency divider 100.

Reference codes 120–123 indicate recording position counters for setting recording positions in buffers 140–143 (to be described below) for storing the 32-channel frame data 1E1–4E1 of the serial/parallel shift registers 110–113. These recording position counters are cleared in accordance with the frame synchronizing signals FS, and count the ⅛-frequency-divided clock signals ⅛CLK of the frequency divider 100 so as to output the counted value to a recording position address of the buffers 140–143.

Reference codes 130–134 indicate reading position counters for setting reading positions for the 32-channel frame data 1E1–4E1 of the buffers 140–143. These reading position counters are cleared by the frame synchronizing signals, and count the clock signals ⅛CLK of the frequency divider 100 so as to output the counted value as the address of the reading position.

Reference codes 140–143 indicate the 64-byte buffers for outputting the 8-bit parallel 32-channel frame data 1E1–4E1 of the serial/parallel shift registers 110–113 in the form of five 24-channel frame data 1T1–5T1.

The buffers 140–143 store the output 32-channel frame data 1E1–4E1 of the serial/parallel shift registers 110–113 in a sequential manner into the addresses which are designated by the output signals of the recording position counters 120–123.

Further, the buffers 140–143 output the stored 32-channel frame data 1E1–4E1 in the form of 24-channel frame data in accordance with the output signals of the reading position counters 130–134. That is, the buffers are selectively accessed by the reading position counters 130–133 and by the reading position counter 134 in accordance with the ¼ frequency-divided clock signals ¼CLK. When the buffers are accessed by the reading position counter 134, the buffers 130–133 are sequentially accessed in accordance with the 1/32-frequency-divided clock signals 1/32CLK.

Reference codes 150–154 indicate parallel/serial shift registers for converting the parallel data of the buffers 140–143 to serial data in accordance with the output signals of the reading position counters 130–134.

The parallel/serial shift registers 150–154 store into themselves the 24-channel frame data of the buffers 140–143 in accordance with the clock signals ⅛CLK of the frequency divider 100. Further the registers 150–154 convert the stored data into serial data in accordance with the clock signals 2048CLK so as to output them as five 24-channel frame data 1T1–5T1 of the T1 repeater line of the North American method.

The first embodiment of the circuit of the present invention constituted as described above will now be described as to its operations.

Figure 2:
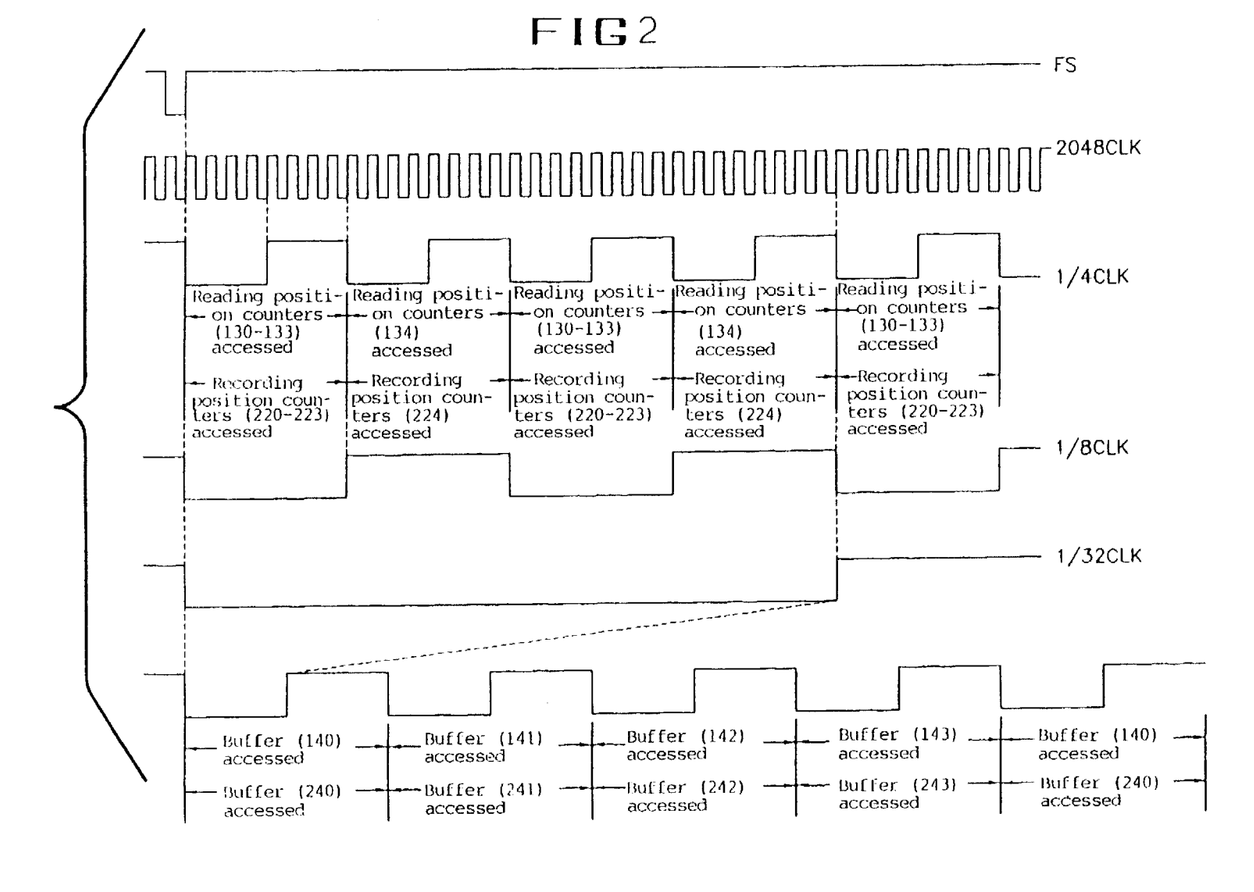
FIGS. 2A to 2D illustrate the wave patterns of the clock signals which have been frequency-divided by the frequency divider of FIG. 1.

First as shown in FIG. 2A, in accordance with the incoming frame synchronizing signals FS, the frequency divider 100, the recording position counters 120–123 and the reading position counters 130–134 are cleared to an initial position.

Then as shown in FIG. 2B, the clock signals 2048CLK inputted with a frequency of 2048 KHz are frequency-divided by the frequency divider 100 into ¼, ⅛ and 1/32. Then as shown in FIGS. 2C to 2E, the frequency-divided clock signals are outputted in the ¼-frequency-divided clock signals ¼CLK, the ⅛-frequency-divided clock signals ⅛CLK, and the 1/32 frequency-divided clock signals 1/32CLK.

Under this condition, the four frame data 1E1, 2E1, 3E1 and 4E1 of the E1 repeater line which are serially inputted with 32 channels respectively are inputted into the serial/parallel shift registers 110–113. Further, the ⅛-frequency-divided clock signals ⅛CLK of the frequency divider 100 and the clock signals 2048CLK which are inputted in synchronization with the frame data 1E1, 2E1, 3E1 and 4E1 are supplied to the serial/parallel shift registers 110–113.

Then the serial/parallel shift registers 110–113 shift the frame data 1E1, 2E1, 3E1 and 4E1 in accordance with the clock signals 2048CLK, and the shifted frame data 1E1, 2E1, 3E1 and 4E1 are outputted as parallel data by 8-bit one channel each time in accordance with the clock signals ⅛CLK.

The recording position counters 120–123 count the clock signals ⅛CLK, and the counted values are outputted as addresses for the recording positions so as to supply them to the buffers 140–143.

Then the buffers 140–143 sequentially records the parallel data of the serial/parallel shift registers 110–113 (which are outputted in 8-bit one channel each time) to the recording positions which are designated by the counted values of the recording position counters 120–123.

Further, the reading position counters 130–134 count the clock signals ⅛CLK, and output the counted values as addresses of the reading positions to the buffers 140–143.

Then the buffers 140–143 sequentially read and output in accordance with the reading position addresses which are designated by the counted values of the reading position counters 130–134.

Under this condition, if the counted values which are provided by counting the clock signals ⅛CLK by the reading position counters 130–134 are not 4N (N being natural numbers of 0–7), then the counted values of the recording position counters 120–124 are not incremented.

Under this condition, the reading position counters 130–133 and the reading position counter 134 cannot simultaneously access the buffers 140–143 to read the stored data.

Therefore, in the present invention as shown in FIG. 2C, the buffers are accessed in the following manner. That is, during one period of the ¼-frequency-divided clock signals ¼CLK which are formed by frequency-dividing the clock signals 2048CLK to ¼, the reading position counters 130–133 access the buffers 140–143 so as to read the stored data. Then during the next one period, the reading position counter 134 accesses the buffers 140–143 so as to read the stored data. These operations are repeated.

Further, of the 32-channel frame data which are stored in the buffers 140–143, the 0th channel frame data is frame aligning channel, while the 16th channel frame data is signaling information channel. Therefore, the actual data channels are 1st–15th and 17th–25th channels.

Therefore, the buffers 140–143 output the data of the 24channels excluding the frame aligning channel and the signaling information channel in accordance with the output signals of the reading position counters 130–133. Thus the 0th –25th time slot channel data are sequentially outputted.

The remaining 26th–31st channel data which are stored on the buffers 140–143 are outputted in accordance with the output signals of the reading position counter 134. Thus the buffers 140–143 output the 24 channel data by 6 channels at a time in accordance with the output signals of the reading position counters 130–134.

Meanwhile, when the reading position counter 134 accesses the four buffers 140–143 so as to output one channel frame data, the counter 134 cannot simultaneously access the four buffers 140–143. Therefore, the four buffers 140–143 are sequentially selected in accordance with the ½32-frequency-divided clock signals ½32CLK, and are accessed in accordance with the output signals of the reading position counter 134, thereby outputting the stored 26th–31st channel data.

That is, as shown in FIG. 2E, the buffer 140 is accessed during the first period of the ½32-frequency-divided clock signals ½32CLK. Then the buffer 141 is accessed during the second period thereof, the buffer 142 is accessed during the third period thereof, and the buffer 143 is accessed during the fourth period thereof. Thus the stored 26th–31st channel data are read, and this procedure is repeated.

Meanwhile, in the case where the value which is obtained by counting the clock signals 2048CLK is 4N (N being an integer of 0–7), the counted values of the recording position counters 130–134 are not incremented, so that the buffers 140–143 would output the preceding data.

Thus the parallel data which are read in accordance with the output signals of the reading position counters 130–134 are inputted into the parallel/serial shift registers 150–154 in accordance with the ⅛-frequency-divided clock signals ⅛CLK so as to be converted into serial data in accordance with the clock signals 2048CLK. These converted serial data are outputted as five 24-channel frame data 1T1, 2T1, 3T1, 4T1 and 5T1 for the T1 repeater line.

Figure 3:
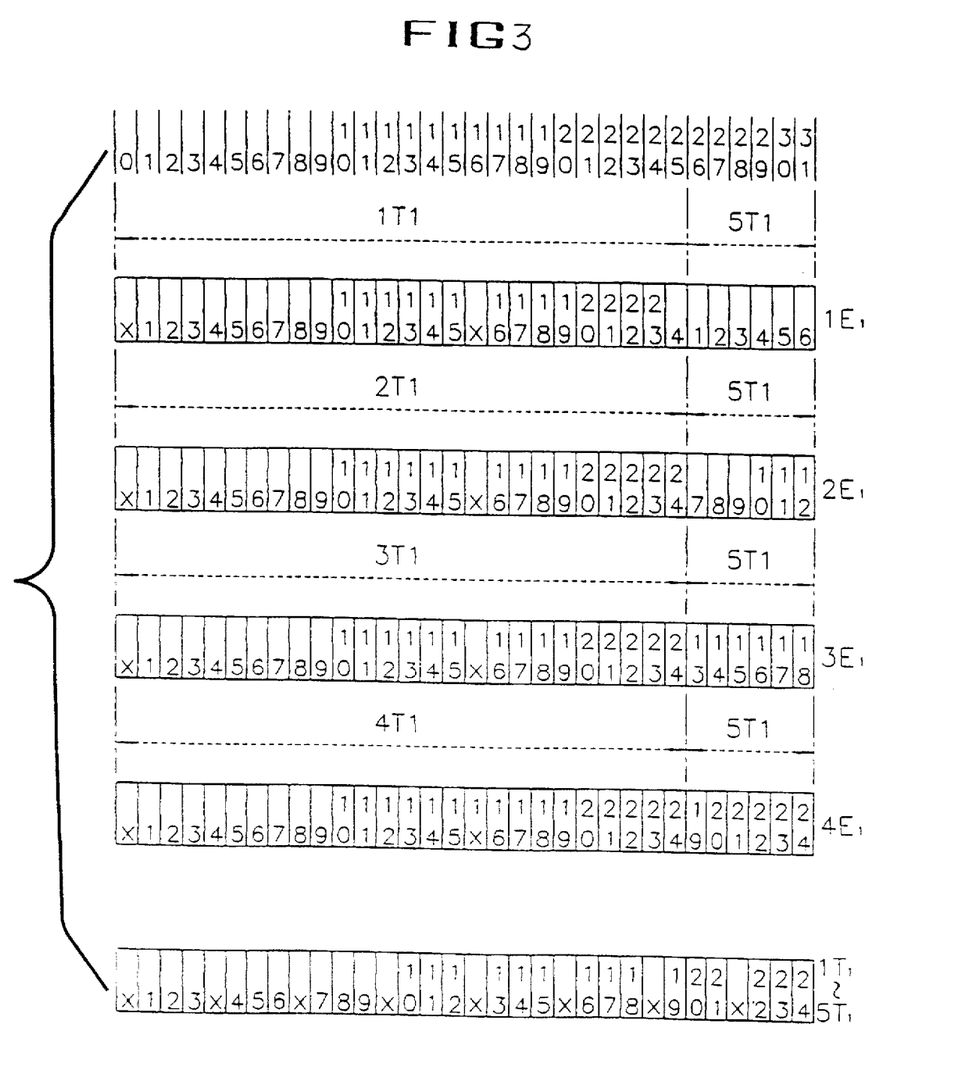
FIGS. 3A to 3F illustrate the procedure of converting the 32-channel frame data of the E1 repeater line of the CEPT method to the 24-channel frame data of the T1 repeater line of the North American method by means of the frame data converting circuit according to the present invention.

Therefore, in the present invention, the frame data are inputted as shown in FIGS. 3B to 3E in accordance with the 0–31 time slots of FIG. 3A. Then the four 32-channel frame data 1E1, 2E1, 3E1 and 4E1 which are stored in the buffers 140–143 are outputted after being converted to five 24-channel frame data 1T1, 2T1, 3T1, 4T1 and 5T1 in accordance with the output signals of the reading position counters 130–134 as shown in FIG. 3F.

Figure 4:
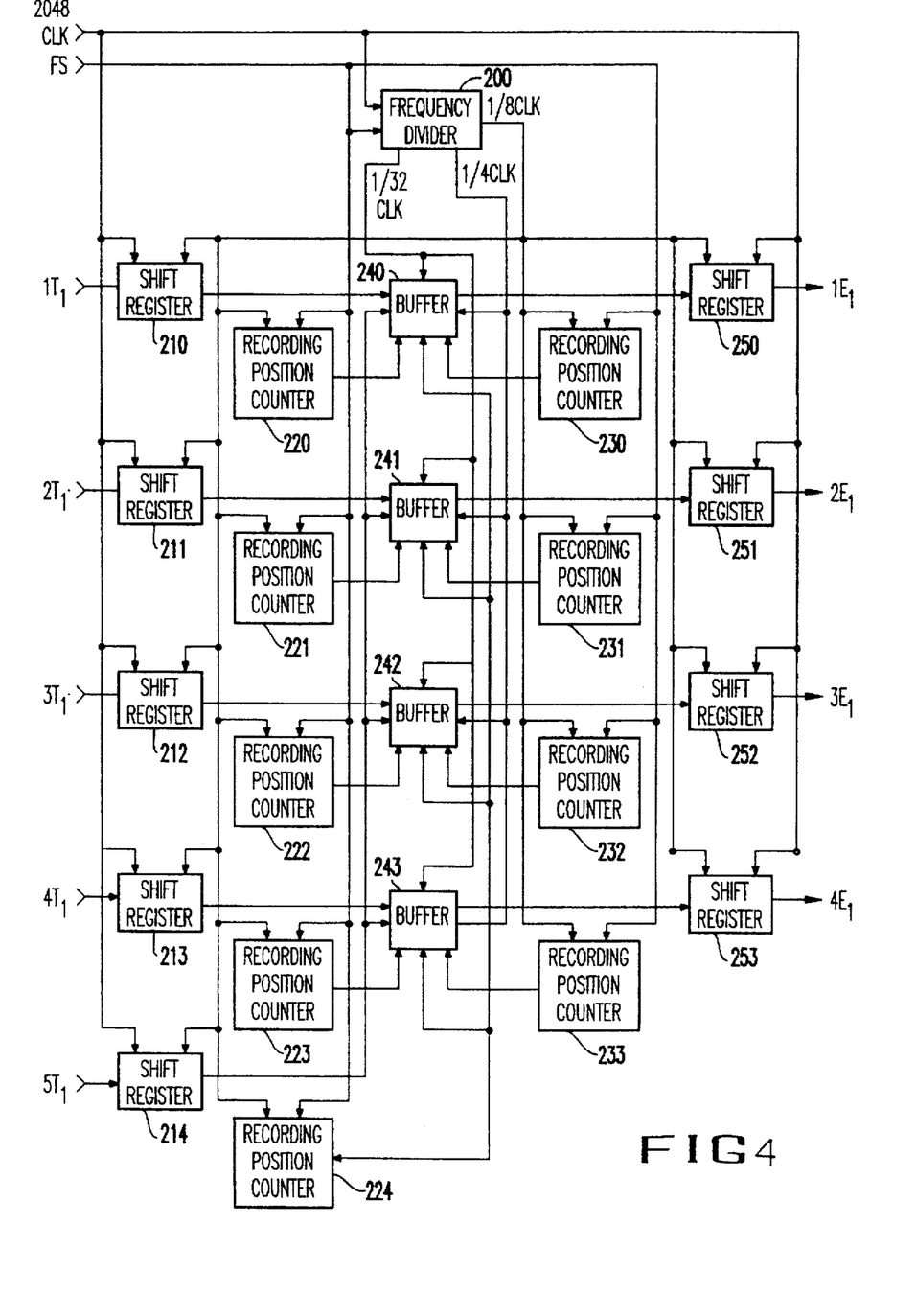
FIG. 4 illustrates another embodiment of the frame data converting circuit for converting the 24-channel frame data of the T1 repeater line of the North American method to the 32-channel frame data of the E1 repeater line of the CEPT method according to the present invention.

FIG. 4 illustrates another embodiment of the frame data converting circuit for converting the 24-channel frame data of the T1 repeater line of the North American method to the 32-channel frame data of the E1 repeater line of the CEPT method according to the present invention.

In this drawing, reference code 200 indicates a frequency divider for frequency-dividing clock signals (2048CLK) having a frequency of 2048 KHz in synchronization with five 24-channel frame data 1T1–5T1 of the T1 repeater line of the North American method.

As in the first embodiment, the frequency divider 200 is cleared in accordance with frame synchronizing signals FS, and starting from the cleared time, frequency-divides the clock signals 2048CLK to ¼, ⅛ and ½24 so as to synchronizingly output ¼-frequency-divided clock signals ¼CLK, ⅛-frequency-divided clock signals ⅛CLK, and ½32-frequency-divided clock signals ½32CLK.

Reference codes 210–214 indicate serial/parallel shift registers for converting the serially inputted 24-channel frame data 1T1–5T1 of the T1 repeater line to parallel data by one channel each time.

The serial/parallel shift registers 210–214 shift the received five 24-channel frame data 1T1–5T1 in accordance with the clock signals 2048CLK, and output them in the form of 8-bit one channel parallel data in accordance with the ⅛-frequency-divided clock signals ⅛CLK of the frequency divider 200.

Reference codes 220–224 indicate recording position counters for setting recording positions in buffers 240–243 (to be described below) for storing the five 24-channel frame data 1T1–5T1 of the serial/parallel shift registers 210–214. These recording position counters are cleared in accordance with the frame synchronizing signals FS, and count the ⅛-frequencydivided clock signals ⅛CLK of the frequency divider 200 so as to output the counted value as recording position addresses of the buffers 240–243.

Reference codes 230–233 indicate reading position counters for setting reading positions for the five 24-channel frame data 1T1–5T1 of the buffers 140–143. These reading position counters are cleared by the frame synchronizing signals FS, and count the clock signals ⅛CLK of the frequency divider 200 so as to output the counted value as the address of the reading position.

Reference codes 240–243 indicate the 64-byte buffers for outputting the 8-bit parallel five 24-channel frame data 1T1–5T1 of the serial/parallel shift registers 210–214 in the form of four 32-channel frame data 1E1–4E1.

The buffers 240–243 store the five output 24-channel frame data 1T1–4T1 of the serial/parallel shift registers 210–213 in a sequential manner into the addresses which are designated by the output signals of the recording position counters 220–223. Further, another 24-channel frame data 5T1 which are outputted from the serial/parallel shift register 214 are divided by 6 channels in accordance with the output signals of the recording position counter 224 so as to be outputted.

Further, the buffers 240–243 are selectively accessed by the recording position counters 220–223 and by the recording position counter 224 in accordance with the ¼-frequency-divided clock signals ¼CLK. When the buffers are accessed by the recording position counter 224, the buffers 240–243 are sequentially accessed in accordance with the 1/32 frequency-divided clock signals 1/32CLK.

Further, the 32-channel frame data which have been stored in the buffers 240–243 are sequentially outputted in accordance with the output signals of the reading position counters 230–233.

Reference codes 250–253 indicate parallel/serial shift registers for converting the parallel 32-channel frame data of the buffers 240–243 (which are outputted in 8 bits one channel) to serial data in accordance with the output signals of the reading position counters 230–233.

The parallel/serial shift registers 250–253 store into themselves the output frame data of the buffers 240–243 in accordance with the clock signals ⅛CLK. Further the registers 250–253 convert the stored data into serial data in accordance with the clock signals 2048CLK so as to output them as four 32-channel frame data 1E1–4E1 of the E1 repeater line of the CEPT method.

The second embodiment of the circuit of the present invention constituted as described above will now be described as to its operations.

In accordance with the frame synchronizing signals FS, the frequency divider 200, the recording position counters 220–224 and the reading position counters 230–233 are cleared to an initial position.

The clock signals 2048CLK inputted with a frequency of 2048 KHz are frequency-divided by the frequency divider 200 into ¼, ⅛ and 1/32. Then the frequency-divided clock signals are outputted in the ¼-frequency-divided clock signals ¼CLK, the ⅛-frequency-divided clock signals ⅛CLK, and the 1/32 frequency-divided clock signals 1/32CLK.

Under this condition, the five frame data 1T1, 2T1, 3T1, 4T1 and 5T1 of the T1 repeater line which are serially inputted with 24 channels respectively are inputted into the serial/parallel shift registers 210–214. Further, the ⅛-frequency-divided clock signals ⅛CLK of the frequency divider 200 and the clock signals 2048CLK which are inputted in synchronization with the five frame data 1T1, 2T1, 3T1, 4T1 and 5T1 are supplied to the serial/parallel shift registers 210 214.

Then the serial/parallel shift registers 210–214 shift the frame data 1T1, 2T1, 3T1, 4T1 and 5T1 in accordance with the clock signals 2048CLK, and the shifted frame data 1T1, 2T1, 3T1, 4T1 and 5T1 are outputted as parallel data by 8-bit one channel each time in accordance with the clock signals ⅛CLK.

The recording position counters 220–224 count the clock signals ⅛CLK, and the counted values are outputted as addresses of the recording positions so as to be supplied to the buffers 240–243.

Then the buffers 240–243 sequentially records the parallel data of the serial/parallel shift registers 210–213 (which are outputted by 8-bit one channel each time) to the recording positions which are designated by the counted values of the recording position counters 220–223. Further, the buffers 240–243 sequentially records the parallel data of the serial/parallel shift register (which are outputted by 8-bit one channel each time) to the recording positions which are designated by the counted value of the recording position counter 224.

Under this condition, the recording position counters 220–223 and the recording position counter 224 cannot simultaneously access the buffers 140–143 to record the data.

Therefore, in the present invention as shown in FIG. 2C, the buffers are accessed in the following manner. That is, during one period of the ¼-frequency-divided clock signals ¼CLK, the recording position counters 220–223 access the buffers 240–243 so as to record the data. Then during the next one period, the recording position counter 224 accesses the buffers 240–243 to record the data. These operations are repeated.

Further, the recording position counter 224 simultaneously cannot access the four buffers 240–243, and the output data of the serial/parallel shift register 214 cannot be stored by 6 channels.

Therefore, in the present invention, the four buffers 240–143 are sequentially accessed in accordance with the 1/32-frequency-divided clock signals 1/32CLK.

That is, as shown in FIG. 2E, the buffers 240–243 are sequentially accessed in accordance with the 1/32-frequency-divided clock signals 1/32CLK. Then in accordance with the output signals of the recording position counter 224, the output data of the serial/parallel shift register 214 are separated by 6 channels to be stored. This operation is repeated.

Then the reading position counters 230–233 count the clock signals ⅛CLK, and the counted values are outputted as addresses of the reading positions so as to be supplied to the buffers 240–243.

Then the buffers 240–243 sequentially read the stored data in accordance with the reading position addresses which are designated by the counted values of the reading position counters 230–233.

Under this condition, if the counted values which are provided by counting the clock signals ⅛CLK by the reading position counters 230–234 are not 4N (N being natural numbers of 0–7), then the counted values of the recording position counters 120–124 are not incremented, but the preceding counted values are outputted.

Thus the parallel data which are read in accordance with the output signals of the reading position counters 230–233 are inputted into the parallel/serial shift registers 250–253 in accordance with the ⅛-frequency-divided clock signals ⅛CLK, and are converted into serial data in accordance with the clock signals 2048CLK so as to be outputted as four 32-channel frame data 1E1, 2E1, 3E1 and 4E1 of the E1 repeater line.

Figure 5:
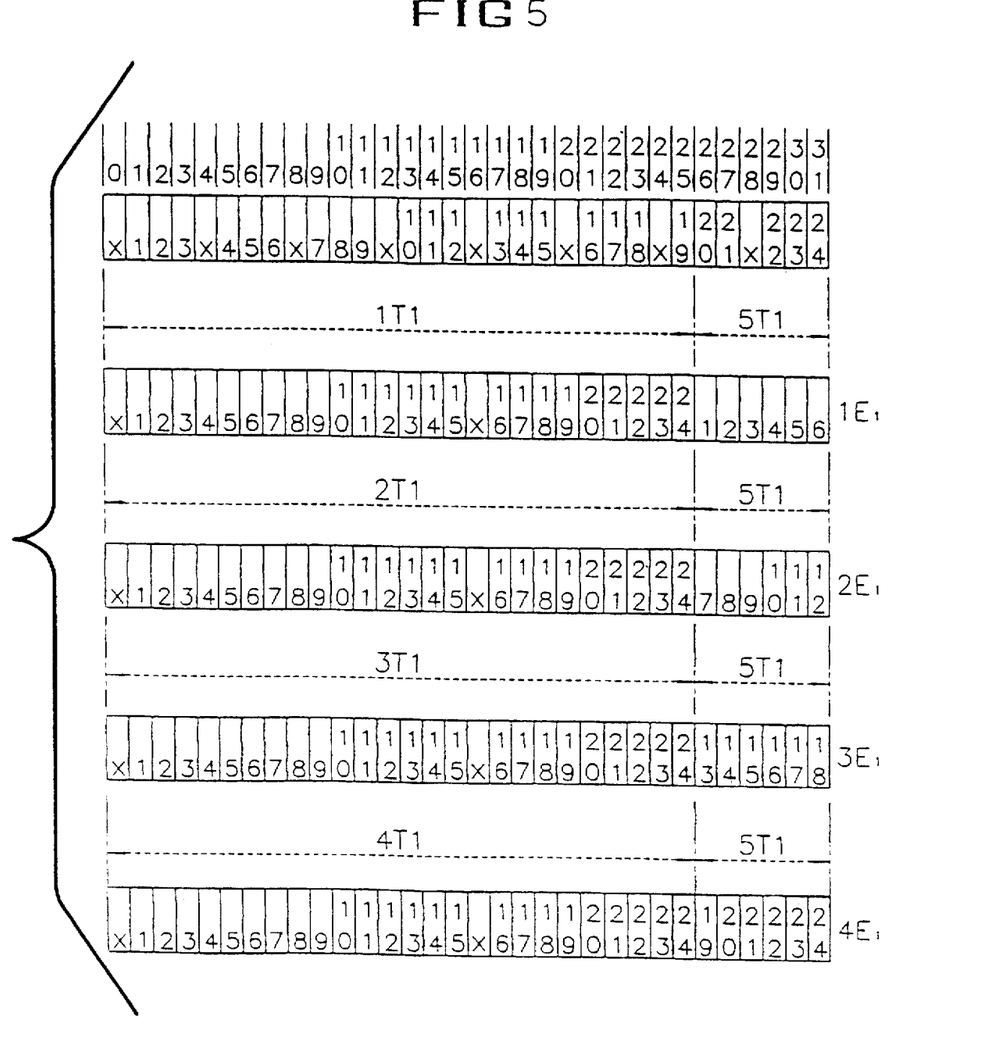
FIGS. 5A to 5F illustrate the procedure of converting the 24-channel frame data of the T1 repeater line of the North American method to the 32-channel frame data of the E1 repeater line of the CEPT method by means of the frame data converting circuit according to the present invention.

Therefore, in the present invention, the frame data are stored in the buffers 140–143 as shown in FIGS. 3B to 3E in accordance with the 0–31 time slots of FIG. 5A. Then as shown in FIG. 3F, the stored data are converted into four 32-channel frame data 1E1, 2E1, 3E1 and 4E1 in accordance with the output signals of the reading position counters 230–233.

Meanwhile in carrying out the present invention, by using only the frame data converting circuit of the first embodiment, data can be transmitted from the E1 repeater line of the CEPT method to the T1 repeater line. Further, by using only the frame data converting circuit of the second embodiment, data can be transmitted from the T1 repeater line of the North American method to the E1 repeater line of the CEPT method. Further, by using both the first and second embodiments, data can be received and transmitted between the E1 repeater line of the CEPT method and the T1 repeater line of the North American method.

According to the present invention as described above, the four 32-channel frame data can be converted into five 24-channel frame data, and the five 24-channel frame data can be converted into the four 32-channel frame data. Therefore, the E1 repeater line of the CEPT method and the T1 repeater line of the North American method can be connected together to make it possible to carry out data communications.

Further, the constitution of the circuit is simple, and therefore, compact and light weight products can be formed. Further, the expensive exclusive time switch ICs are not used, and therefore, the manufacturing cost can be saved.

What is claimed is:

1. A circuit for converting frame data, comprising:

a frequency divider for frequency-dividing clock signals 2048CLK into clock signals ¼CLK, ⅛CLK and 1/32CLK;

four serial/parallel shift registers for converting serially inputted four 32-channel frame data of E1 repeater line of the CEPT method to parallel data, and for outputting the converted frame data by 8-bit one channel at a time;

four recording position counters for counting the clock signals ⅛CLK to set recording positions;

five reading position counters for counting the clock signals ⅛CLK to designate reading positions;

four buffers for sequentially storing output signals of said serial/parallel shift registers to recording positions designated by said recording position counters, for outputting the frame data by 24 channels at a time in accordance with output signals of said reading position counters, and for outputting the data of the remaining 6 channels in accordance with output signals of the last one of said reading position counters;

four parallel/serial shift registers for converting the 24-channel data of said buffers to serial data; and another parallel/serial shift register for converting the remaining 6-channel output data of said buffers into serial data.

2. The circuit as claimed in claim 1, wherein said buffers are alternately accessed by first four of said reading position counters and the last one of said reading position counters, and when said buffers are accessed the last one of said reading position counters, the accessing is made sequentially in accordance with the clock signals 1/32CLK.

3. The circuit as claimed in any one of claims 1 and 2, wherein, if counted values of said reading position counters are 4N, wherein N being a natural number of 0–7, the counted values are not incremented.

4. A circuit for converting frame data, comprising:

a frequency divider for being cleared by synchronizing signals FS, and for frequency-dividing clock signals 2048CLK into clock signals ¼CLK, ⅛CLK and 1/32CLK;

five serial/parallel shift registers for converting serially inputted five 24-channel frame data to parallel data, and for outputting the converted frame data by 8-bit one channel at a time;

five recording position counters for counting the clock signals ⅛CLK to set recording positions;

four reading position counters for counting the clock signals ⅛CLK to designate reading positions;

four buffers for sequentially storing output signals of said serial/parallel shift registers to recording positions designated by said recording counters, for separating the output signals of the last one of said serial/parallel shift registers by 6 channels so as to store them at the recording positions designated by the last one of said recording position counters, and for sequentially outputting the data in accordance with output signals of said reading position counters; and four parallel/serial shift registers for converting the output data of said buffers to serial data.

5. The circuit as claimed in claim 4, wherein said buffers are alternately accessed by first four of said recording position counters and the last one of said recording position counters, and when said buffers are accessed the last one of said recording position counters, the accessing is made sequentially in accordance with the clock signals 1/32CLK.

6. The circuit as claimed in any one of claims 4 and 5, wherein, if counted values of said recording position counters are 4N, wherein N being a natural number of 0–7, the counted values are not incremented.

7. A circuit for converting frame data, comprising:

a frequency divider for being cleared in accordance with synchronizing signals FS, and for frequency-dividing clock signals 2048CLK into clock signals ¼CLK, ⅛CLK and 1/32CLK;

a first set of four serial/parallel shift registers for converting serially inputted four 32-channel frame data of E1 repeater line of the CEPT method to parallel data, and for outputting the converted frame data by 8-bit one channel at a time;

a first set of four recording position counters for counting the clock signals ⅛CLK to set recording positions;

a first set of five reading position counters for counting the clock signals ⅛CLK to designate reading positions;

a first set of four buffers for sequentially storing output signals of said serial/parallel shift registers to recording positions designated by said recording position counters, for outputting the frame data by 24 channels at a time in accordance with output signals of said reading position counters, and for outputting the data of the remaining 6 channels in accordance with output signals of the last one of said reading position counters;

a first set of four parallel/serial shift registers for converting the 24-channel data of said buffers to serial data; and another parallel/serial shift register for converting the remaining 6-channel output data of said buffers into serial data;

a second set of five serial/parallel shift registers for converting serially inputted five 24-channel frame data to parallel data, and for outputting the converted frame data by 8-bit one channel at a time;

a second set of five recording position counters for counting the clock signals ⅛CLK to set recording positions;

a second set of four reading position counters for counting the clock signals ⅛CLK to designate reading positions;

a second set of four buffers for sequentially storing output signals of said serial/parallel shift registers to recording positions designated by said recording counters, for separating the output signals of the last one of said serial/parallel shift registers by 6 channels so as to store them at the recording positions designated by the last one of said recording position counters, and for sequentially outputting the data in accordance with output signals of said reading position counters; and a second set of four parallel/serial shift registers for converting the output data of said buffers to serial data.

8. The circuit as claimed in claim 7, wherein:

the first set of said buffers are alternately accessed by first four of the first set of said reading position counters and by the last one of the first set of said reading position counters;

when the first set of said buffers are accessed by the last one of the first set of said reading position counters, the first set of said buffers are sequentially accessed in accordance with the clock signals 1/32CLK;

the second set of said buffers are alternately accessed by the first four of the second set of said recording position counters and by the last one of the second set of said recording position counters; and when the second set of said buffers are accessed by the last one of the second set of said recording position counters, the second set of said buffers are sequentially accessed in accordance with the clock signals 1/32CLK.

9. The circuit as claimed in claim 8, wherein, if counted values of the first set of said reading position counters are 4N, wherein N being a natural number of 0–7, the counted values are not incremented.

10. The circuit as claimed in claim 8, wherein, if counted values of the second set of said recording position counters are 4N, wherein N being a natural number of 0–7, the counted values are not incremented.

* * * * *